Nov. 4, 1952 N. SWINDIN 2,616,790
METHOD FOR THE REGENERATION OF SPENT IRON
AND SULFURIC ACID PICKLE LIQUORS
Filed June 2, 1947 2 SHEETS—SHEET 1

Inventor
Norman Swindin
By
Attorneys

Nov. 4, 1952 N. SWINDIN 2,616,790
METHOD FOR THE REGENERATION OF SPENT IRON
AND SULFURIC ACID PICKLE LIQUORS
Filed June 2, 1947 2 SHEETS—SHEET 2
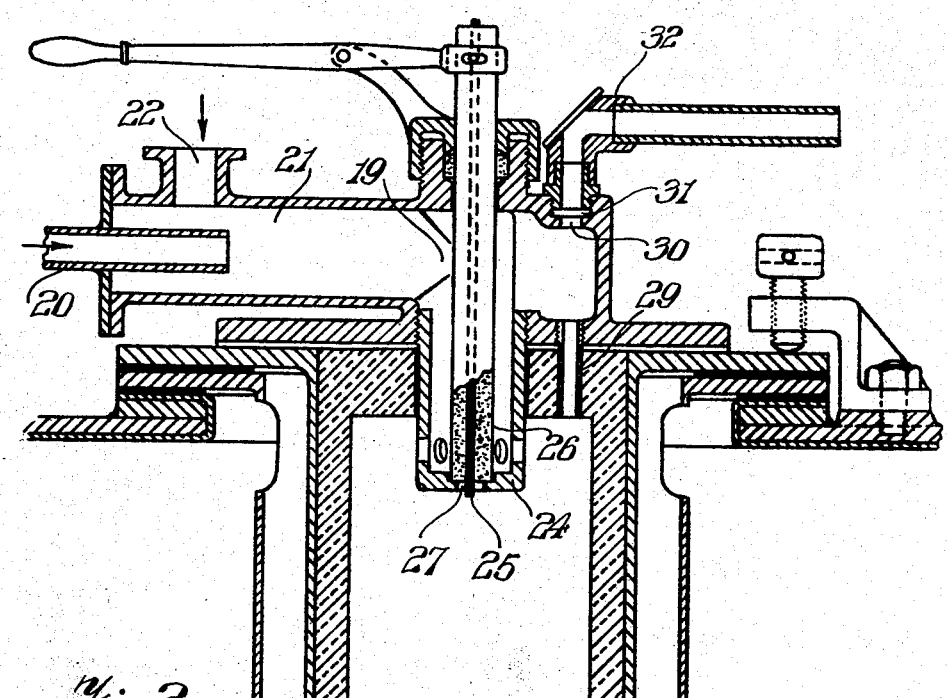
Fig.2.
Fig.4.
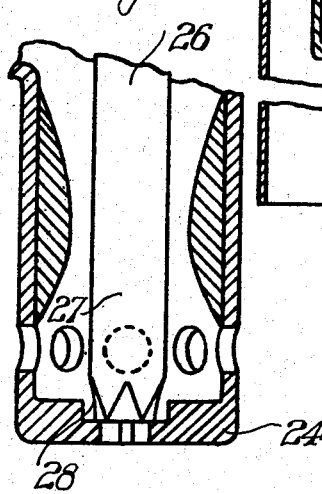
Fig.3.
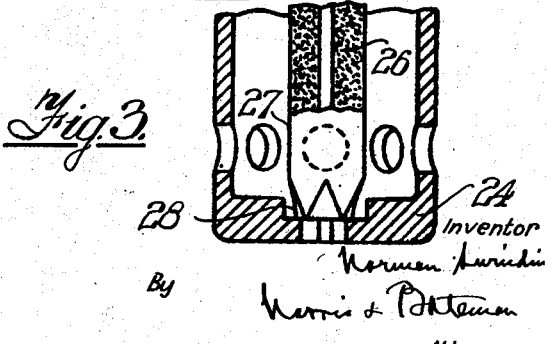
Inventor
Norman Swindin
By
Harris & Bateman
Attorneys.

UNITED STATES PATENT OFFICE 2,616,790

METHOD FOR THE REGENERATION OF SPENT IRON AND SULFURIC ACID PICKLE LIQUORS

Norman Swindin, London, England

Application June 2, 1947, Serial No. 751,806
In Great Britain June 6, 1946

5 Claims. (Cl. 23—126)

This invention relates to the treatment of acid pickle liquors for pickling iron and steel and the object of the invention is to provide an improved method of and means for regenerating spent acid pickle liquors and for recovering in an anhydrous or substantially anhydrous form from the spent liquor the ferrous sulphate formed during pickling and it finds particular application when a submerged burner is used as the means of evaporating the liquids in that the burner shows little or no tendency to become choked by the deposition of anhydrous ferrous sulphate in or near to the nozzle of the burner in such a way as progressively to reduce the area of the exit until the flame is extinguished or becomes so small that it strikes back into the mixing tube. It has the further advantage of giving the solid matter in the form of fine and easily filtrable crystals as distinguished from the partially hydrolysed and difficultly filtrable solids which are formed when the ferrous sulphate is first crystallised as the heptahydrate by cooling the crude spent pickle and then dehydrated by heating under pressure under conditions of low acidity.

It has been observed that, if a sulphuric acid solution saturated with ferrous sulphate and containing approximately 60% acid has added thereto a spent pickle liquor containing, say 10% sulphuric acid and 20–30% ferrous sulphate and the solution is heated so as to evaporate water therefrom and maintain the sulphuric acid content at 60% or thereabout, then the greater part of the added ferrous sulphate is precipitated, since the solubility of ferrous sulphate in 60% sulphuric acid does not exceed 1% or 2%.

The present application is a continuation-in-part of my prior co-pending application Serial No. 557,148, filed October 4, 1944, now abandoned.

According to the invention the improved process for the regeneration of spent iron and steel acid pickle liquors consists in adding spent acid pickle liquor to a concentrated solution of sulphuric acid heated so as constantly to evaporate water therefrom, and in removing precipitated ferrous sulphate and accumulated excess sulphuric acid solution therefrom, the rate of addition of said spent liquor and the rate of evaporation from said sulphuric acid solution being regulated so as to maintain the proportion of sulphuric acid in said solution at between 40% and 60%.

According to a further feature of the invention an improved apparatus for carrying out the process above referred to is provided wherein a treatment vessel lined with acid resistant material has arranged in or near the upper portion thereof a submerged flame burner, said treatment vessel having a base sloping downwards from the vicinity of said burner and means being provided for introducing and withdrawing at will fluid and/or solid materials into or from said vessel.

In order that the invention shall be more fully described and ascertained reference is made to the accompanying drawing wherein:

Figs. 2-4 show details of the burner to an enlarged scale.

Figure 1:
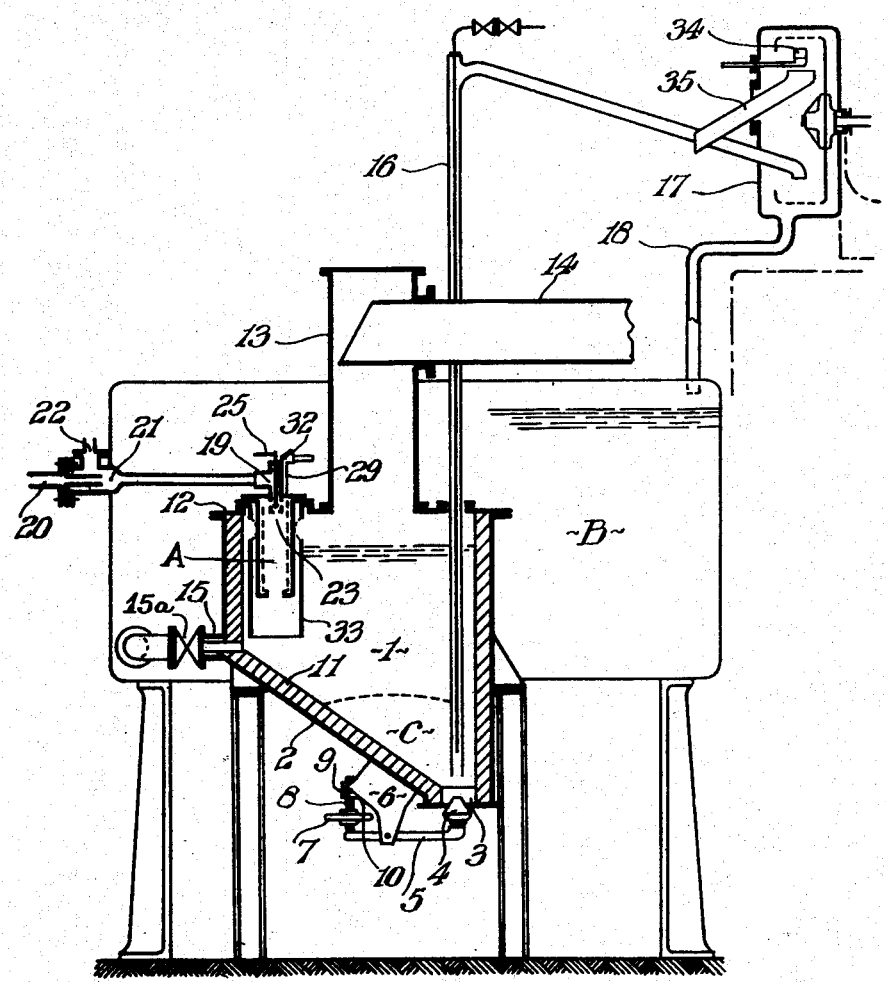
Fig. 1 shows an acid treatment bath in vertical sectional elevation.

The drawings show a preferred form of apparatus for carrying out the process according to the invention, wherein a closed tank 1 is provided with a sloping bottom 2 converging towards a basal outlet 3 closable by a plug valve 4 which may be opened in order to empty the plant for the purpose of repair or shut-down. Said valve 4 is universally mounted on a lever 5 adapted to pivot on a bracket 6 under the action of a hand wheel 7 mounted fast on a shaft 8, the latter being fitted in a threaded nut 9 mounted on trunnions 10. The tank 1 may be made of rubber-lined mild steel, and further protected with acid proof tiles or bricks 11. The said tank 1 has a cover 12 and is provided with a steam and spent gas off-take pipe 13 communicating with a conduit 14 adapted to convey the vapours while hot to a main pickling tank B and thereby assist in the transfer of heat to the pickling liquor.

The tank 1 is provided with a submerged flame burner referred to as a whole as A, an inlet conduit 15 for spent acid, having a control valve 15a, and an air lift pump 16 of known construction having an air control valve 16a, adapted to transfer sludge-like finely-crystalline ferrous sulphate precipitated in the tank, together with a proportion of acid liquor, to a centrifuge or separator 17, the ferrous sulphate being removed therefrom by a scraper 34 and discharged through a conduit 35, and the acid filtrate being returned by a pipe 18 to a regenerative acid store tank or to the aforesaid main pickling tank B.

The burner A is fitted into the cover 12 of the tank 1, and consists of a mixing chamber 19 supplied with gas through a pipe 20 arranged coaxially within a manifold 21, to which latter air is admitted by pipe 22. The mixing chamber 19 depends into the combustion chamber 23 and is fitted at its base with a perforate terminal 24 (see Fig. 2). A high tension electrode wire 25 embedded in a steatite sheath 26 is mounted coaxially within the mixing chamber 19, said sheath 26 being formed with a loosely socketing foot 27 that is peripherally fluted as at 28 (Figs. 3 and 4) so as to give a combustible mixture entrance to the chamber 23 and a sparking point is led from the electrode 25 to the metal wall of the combustion chamber, the latter being at earth potential. A flame inspection tube 29, 30 is provided on the cover of the body of the burner A, the top of said tube 30 being provided with a sight glass 31 and a periscope 32. A tubular shroud 33, perforated at its upper end, is disposed around the combustion chamber 23, to enable gas and steam readily to escape to the fume pipe 13 The construction of the burner A is described in greater detail in my co-pending application Serial No. 751,807 filed of even date herewith.

The introduction of sulphuric acid for starting up the plant may be effected in any suitable way as, for example, by removing the burner, or through the air lift, or through a suitable opening which may be provided in the cover 12 of the tank 1.

Since with definite proportions of gas and air such as would normally be provided, the temperature of the liquor may be taken as an accurate indication of its acid content, the air valve 16a of the air lift, may be opened manually or in any other known way when the temperature of the liquor reaches a predetermined value and closed when the temperature thereof drops below that value, and the feed control valve 15a may be operated manually or by any other known means to regulate the rate of addition of pickle liquor to the tank 1, in order to maintain the desired sulphuric acid concentration in the acid liquor.

The operation of the invention is as follows:

The boiling point of 60% sulphuric acid at atmospheric pressure is 140° C. but under the partial pressure conditions which obtain when the products of combustion pass through the liquid the "boiling point" is 10° or 15° C. lower than this.

Since a temperature of 125° to 130° C. is considerably higher than the normal working temperature of the contents of the main pickling tank, and since, moreover, the gases become saturated with water vapour on cooling to about 85° C. it is possible to use a considerable proportion of the sensible and latent heats of the vapours and gases from the fume duct 14 to maintain the temperature of the acid liquor in the main pickling tank B for efficient pickling, in the same way as is accomplished with live steam. The spent weak acid, rich in ferrous sulphate, from the main pickling bath B enters tank 1 through pipe 15 just below the burner A where it meets a hot, downwardly directly stream of flame and gas from the combustion chamber 23. As concentration of the acid in the spent liquor progresses the ferrous sulphate having nil or only one or two molecules of water in its composition comes out of solution as a granulated mass of small crystals which are easy to filter and is deposited towards the base of the vessel as indicated at C. From this point it may be withdrawn from time to time, together with a small admixed quantity of sulphuric acid, by means of the air lift 16 in which the ferrous sulphate is not cooled to an extent to clog it, the ferrous sulphate being separated from the acid in the centrifuge 17.

By means of the process described the ferrous sulphate is obtained in an anhydrous or substantially anhydrous form, the crystals containing two molecules or less of water. Also, the crystals are small, and this fact, combined with the anhydrous nature of the ferrous sulphate results in the formation of a product which can be easily separated from the sulphuric acid admixed therewith.

I claim:

1. A process for the regeneration of spent acid liquors containing ferrous sulphate and sulphuric acid, comprising confining a body of a solution of sulphuric acid having an initial concentration of 40% to 60%, constantly heating and evaporating water from said body of solution by a submerged flame and concurrently withdrawing spent acid liquor from a treating bath and adding the same to said body of sulphuric acid solution, said evaporation and addition of spent acid liquor being at such relative rates as to maintain the concentration of sulphuric acid in said body constant at a specific percentage between 40% to 60% for precipitation therefrom of granular and readily filterable ferrous sulphate in the form of $FeSO_4 \cdot XH_2O$ in which X is less than 3, removing the precipitated ferrous sulphate and liquid from said body of acid solution, separating the ferrous sulphate from said liquid, and returning the sulphuric acid thus separated to the treating bath.

2. A process as defined in claim 1, wherein said body of sulphuric acid solution is maintained at the boiling point and contains a saturated solution of ferrous sulphate.

3. A process as defined in claim 1, wherein said body of sulphuric acid solution is maintained at a temperature of between 105° C. and 140° C.

4. A process for the regeneration of spent acid liquors containing ferrous sulphate and sulphuric acid, comprising confining a body of a solution of sulphuric acid having an initial concentration of 40% to 60%, constantly heating and agitating said body of sulphuric acid solution by a submerged flame to evaporate water therefrom and concurrently withdrawing spent acid liquor from a treating bath and adding the same to said body of sulphuric acid solution, said evaporation and addition of spent acid liquor being at such relative rates as to maintain the concentration of sulphuric acid in said body at a constant percentage between 40% and 60% and the temperature of said body between 105° C. and 140° C. and to maintain a saturated solution of ferrous sulphate in said body for precipitation of granular and readily filterable ferrous sulphate therefrom in the form of $FeSO_4 \cdot XH_2O$ in which X is less than 3, removing the precipitated ferrous sulphate and liquid from said body of acid solution, separating the precipitated ferrous sulphate from said liquid, and returning sulphuric acid thus separated to the treating bath.

5. A process employing a submerged flame burner for regenerating spent iron and sulphuric acid pickle liquors while avoiding incrustation of the burner with ferrous sulphate, comprising constantly heating and agitating a body of sulphuric acid solution having an initial concentration of 40% to 60% by the submerged flame to evaporate water therefrom and concurrently withdrawing spent acid pickle liquor from a pickling bath and adding the same to said body of sulphuric acid solution, said evaporation and addition of spent acid liquor being at such relative rates as to maintain the concentration of sulphuric acid in said body at a constant percentage between 40% and 60% and the temperature of said body between 105° C. and 140° C. for precipitation from said body of granular and readily filterable ferrous sulphate in the form of $FeSO_4.XH_2O$ in which X is less than 3, removing the precipitated ferrous sulphate and sulphuric acid from said body of acid solution, separating and recovering said ferrous sulphate from said sulphuric acid, and returning the sulphuric acid to the pickling bath.

NORMAN SWINDIN.

REFERENCES CITED

The following references are of record in the file of this patent:

UNITED STATES PATENTS

| Number | Name | Date |
|---|---|---|
| 1,045,723 | McFetridge | Nov. 26, 1912 |
| 1,146,071 | Hoffman | July 13, 1915 |
| 1,589,610 | Marsh | June 22, 1926 |
| 2,017,773 | N. B. Smith et al. | Oct. 15, 1935 |
| 2,078,088 | Mantius et al. | Apr. 20, 1937 |
| 2,086,902 | Doennecke | July 13, 1937 |
| 2,118,272 | E. A. C. Smith | May 24, 1938 |
| 2,184,419 | Fowler et al. | Dec. 26, 1939 |
| 2,185,095 | R. P. Smith et al. | Dec. 26, 1939 |
| 2,271,524 | Marek | Feb. 3, 1942 |
| 2,322,134 | Hodge | June 15, 1943 |

FOREIGN PATENTS

| Number | Country | Date |
|---|---|---|
| 232,581 | Great Britain | June 24, 1926 |
| 562,596 | Great Britain | July 7, 1944 |
| 575,776 | Great Britain | Mar. 5, 1946 |
| 623,446 | Great Britain | May 18, 1949 |
| 413,067 | France | July 30, 1910 |

OTHER REFERENCES

Swindin, "Institute of Chemical Engineers," vol. 22, pages 56–71 (1944).